US012803453B2

(12) United States Patent
Choi et al.

(10) Patent No.: US 12,803,453 B2
(45) Date of Patent: Nov. 17, 2026

(54) SWITCHING MODE POWER SUPPLY AND CONTROLLING METHOD THEREOF

(71) Applicant: SAMSUNG ELECTRONICS CO., LTD., Suwon-si (KR)

(72) Inventors: Youngho Choi, Suwon-si (KR); Sangmin Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 18/206,428

(22) Filed: Jun. 6, 2023

(65) Prior Publication Data

US 2023/0387820 A1 Nov. 30, 2023

Related U.S. Application Data

(63) Continuation of application No. PCT/KR2023/006109, filed on May 4, 2023.

(30) Foreign Application Priority Data

May 26, 2022 (KR) ........................ 10-2022-0064976
Aug. 17, 2022 (KR) ........................ 10-2022-0102782

(51) Int. Cl.
*H02M 5/458* (2006.01)
*H02H 7/12* (2006.01)
(Continued)

(52) U.S. Cl.
CPC .......... *H02M 5/458* (2013.01); *H02H 7/1203* (2013.01); *H02M 1/0009* (2021.05); (Continued)

(58) Field of Classification Search
CPC .......... H02M 1/009; H02M 1/44; H02M 3/01; H02M 3/33571; H02M 5/458; H02M 7/1203
(Continued)

(56) References Cited

U.S. PATENT DOCUMENTS 5,977,530 A * 11/1999 Bessho ............. H02M 3/33571 219/715
6,127,789 A * 10/2000 Ishizuka ............ H05B 41/2925 315/308
(Continued)

FOREIGN PATENT DOCUMENTS

CN 117693877 A * 3/2024 ............... H02H 3/05
DE 20 2021 101 726 U1 9/2021
(Continued)

OTHER PUBLICATIONS

International Search Report (PCT/ISA/210) issued by the International Searching Authority on Aug. 18, 2023 in International Application No. PCT/KR2023/006109.
(Continued)

*Primary Examiner* — Thienvu V Tran
*Assistant Examiner* — Lauren Ashley Shaw
(74) *Attorney, Agent, or Firm* — Sughrue Mion, PLLC

(57) ABSTRACT

A switching mode power supply including: a power input unit configured to receive an input alternating current (AC) voltage; a rectification unit configured to rectify the input AC voltage; a condenser configured to smooth the rectified input AC voltage; a current detection unit configured to detect a surge current flowing in the condenser; and a converter including switching elements, the converter outputting a direct current (DC) voltage based on a voltage applied to first and second ends of the condenser and on/off duty ratios of the switching elements. The switching elements are configured to be turned off based on the surge current being detected by the current detection unit.

16 Claims, 8 Drawing Sheets

(51) Int. Cl.

| | |
|---|---|
| ***H02M 1/00*** | (2007.01) |
| ***H02M 1/44*** | (2007.01) |
| ***H02M 3/00*** | (2006.01) |
| ***H02M 3/335*** | (2006.01) |

(52) U.S. Cl.
CPC ................ *H02M 1/44* (2013.01); *H02M 3/01* (2021.05); *H02M 3/33571* (2021.05)

(58) Field of Classification Search
USPC ........................................................... 363/37
See application file for complete search history.

(56) References Cited

U.S. PATENT DOCUMENTS

| | | | | |
|---|---|---|---|---|
| 11,031,777 | B2 | 6/2021 | Joo et al. | |
| 11,081,876 | B2 * | 8/2021 | Yu | H02M 7/062 |
| 2008/0049466 | A1 | 2/2008 | Cho | |
| 2009/0272735 | A1 * | 11/2009 | Suenaga | H05B 6/685 219/702 |
| 2010/0155393 | A1 | 6/2010 | Suenaga et al. | |
| 2010/0155394 | A1 | 6/2010 | Suenaga et al. | |
| 2010/0155395 | A1 | 6/2010 | Suenaga et al. | |
| 2019/0379278 | A1 * | 12/2019 | Niv | H02M 1/32 |
| 2020/0178371 | A1 | 6/2020 | Malyna et al. | |

FOREIGN PATENT DOCUMENTS

| | | | | |
|---|---|---|---|---|
| EP | 4123893 | A1 * | 1/2023 | H02M 1/123 |
| JP | 10-32982 | A | 2/1998 | |
| JP | 2007-181357 | A | 7/2007 | |
| JP | 2007-324018 | A | 12/2007 | |
| JP | 4240968 | B2 * | 3/2009 | |
| JP | 2013-211119 | A | 10/2013 | |
| JP | 2014-117129 | A | 6/2014 | |
| JP | 2017-199538 | A | 11/2017 | |
| JP | 2019-54652 | A | 4/2019 | |
| JP | 2019-145395 | A | 8/2019 | |
| KR | 10-2009-0077107 | A | 7/2009 | |
| KR | 10-1123440 | B1 | 3/2012 | |
| KR | 10-2020-0073470 | A | 6/2020 | |
| WO | WO-2013099918 | A1 * | 7/2013 | H02M 1/4258 |

OTHER PUBLICATIONS

Communication dated Mar. 24, 2025, issued by the European Patent Office in European Application No. 23812033.1.

* cited by examiner 100-3

SWITCHING MODE POWER SUPPLY AND CONTROLLING METHOD THEREOF

CROSS-REFERENCE TO RELATED APPLICATION(S)

This application is a bypass continuation of International Application No. PCT/KR2023/006109, filed on May 4, 2023, which is based on and claims priority to Korean Patent Application No. 10-2022-0064976, filed on May 26, 2022 and Korean Patent Application No. 10-2022-0102782, filed on Aug. 17, 2022, in the Korean Intellectual Property Office, the disclosures of which are incorporated by reference herein in their entireties.

BACKGROUND

1. Field

The disclosure relates to a switching mode power supply, and more particularly, to a switching mode power supply (SMPS) that may adjust a level of power based on on/off operations of switching elements.

2. Description of Related Art

When a strong surge component is applied to a power input end of an electronic device, e.g., due to a thunderstroke, various components of the electronic device may be damaged. In particular, an SMPS supplying power to the electronic device includes semiconductor switching elements, and these semiconductor switching elements may break down, e.g., due to the thunderstroke.

In general, a switching mode power supply includes a rectification circuit for converting an alternating current (AC) into a direct current (DC), and an electrolytic condenser having a big capacity. In case the electrolytic condenser has a big capacity of, for example, higher than or equal to 68 uF, even when a strong surge (e.g., ±8 kV) is applied between a live point/a neutral point of the input end, the electrolytic condenser may absorb the entire surge energy. Accordingly, switching elements on the rear end of the condenser may be protected.

However, in a case of a single-stage converter where an electrolytic condenser having a small capacity is used, strong surge energy may not be entirely absorbed by the condenser, and thus, the switching elements may be damaged.

As an electrolytic condenser entails a big risk of occurrence of fire, and does not have a long lifespan, there have been various attempts in the industry for replacing an electrolytic condenser used for a power supply by a film condenser. However, a film condenser cannot be made to have a big capacity, unlike an electrolytic condenser. Accordingly, even in the case of a switching mode power supply using a film condenser for preventing fire, surge energy due to a thunderstroke cannot be entirely absorbed by the film condenser, and thus the switching elements cannot be protected.

SUMMARY

According to an aspect of the disclosure, a switching mode power supply includes: a power input unit configured to receive an input alternating current (AC) voltage; a rectification unit configured to rectify the input AC voltage; a condenser configured to smooth the rectified input AC voltage; a current detection unit configured to detect a surge current flowing in the condenser; and a converter including switching elements, the converter outputting a direct current (DC) voltage based on a voltage applied to first and second ends of the condenser and on/off duty ratios of the switching elements. The switching elements are configured to be turned off based on the surge current being detected by the current detection unit.

The switching mode power supply may further includes a controller configured to: control a magnitude of the DC voltage output by the converter by controlling on/off operations of the switching elements, and based on the current detection unit detecting the surge current while the converter outputs the DC voltage, turn off the switching elements.

In the switching mode power supply, the current detection unit may include: a first resistance having a first end to which a current flowing in the condenser is applied, and a second end connected to a ground terminal; and a comparator configured to: compare a voltage applied to the first end of the first resistance due to the current flowing in the condenser and a reference voltage, and output a first output voltage.

In the switching mode power supply, the comparator may be further configured to, based on a voltage due to the surge current being applied to the first end of the first resistance while outputting the first output voltage, output a second output voltage. The controller is further configured to, based on the second output voltage being output by the comparator, turn off the switching elements.

The switching mode power supply may further include a voltage detection unit includes a second resistance. The voltage detection unit may be configured to provide a current flowing between the power input unit and the rectification unit to the controller through the second resistance. The controller may be further configured to, based on a first voltage detected due to the current applied through the second resistance being greater than or equal to a first predetermined value, turn off the switching elements.

The switching mode power supply may further include a third resistance that is connected in parallel with the second resistance when the comparator outputs the second output voltage. The controller may be configured to, based on a second voltage, detected based on the currents applied through the second resistance and the third resistance connected in parallel, being greater than or equal to the first predetermined value, turn off the switching elements.

The switching mode power supply may further include a varistor connected in parallel with the condenser. A voltage applied to the first and second ends of the condenser may be clamped at a second predetermined value by the varistor, based on a voltage greater than or equal to the second predetermined value being applied to the first and second ends of the condenser.

In the switching mode power supply, the second predetermined value may be lower than an inner voltage of the switching elements.

The switching mode power supply may further include a voltage detection unit configured to detect a magnitude of a voltage input through the power input unit. The controller may be further configured to, based on a voltage detected by the voltage detection unit becoming lower than or equal to a third predetermined value after the switching elements are turned off, control the on/off operations of the switching elements.

In the switching mode power supply, a capacity of the condenser is lower than or equal to 47 uF.

According to another aspect of the disclosure, a controlling method of a switching mode power supply, includes: receiving an input alternating current (AC) voltage; rectifying the input AC voltage; smoothing the rectified input alternating current (AC) voltage through a condenser of the switching mode power supply; outputting a direct current (DC) voltage based on a voltage applied to first and second ends of the condenser and on/off duty ratios of switching elements of a converter of the switching mode power supply; detecting a surge current flowing in the condenser; and based on the surge current being detected, turning off the switching elements.

In the controlling method, the outputting the DC voltage includes controlling a magnitude of the DC voltage by controlling on/off operations of the switching elements. The turning off the switching elements includes, based on detecting the surge current while the DC voltage is being output, turning off the switching elements.

The controlling method may further include: applying a current flowing in the condenser to a first end of a first resistance of a current detection unit of the switching mode power supply; comparing, by a comparator of the switching mode power supply, a voltage applied to the first end of the first resistance due to the current flowing in the condenser with a reference voltage; and outputting, by the comparator, a first output voltage based on the comparing the voltage applied to the first end of the first resistance with the reference voltage.

The controlling method may further include: based on a voltage due to the surge current being applied to the first end of the first resistance at a time of outputting the first output voltage, outputting a second output voltage by the comparator; and based on the comparator outputting the second output voltage, turning off the switching elements.

The controlling method may further include: detecting, by a voltage detection unit of the switching mode power supply, a magnitude of the input AC voltage through a second resistance, and based on a first voltage detected by the voltage detection unit, the first voltage being greater than or equal to a first predetermined value, turning off the switching elements.

The controlling method may further include turning off the switching elements, based on a second voltage due to a current applied through the second resistance and a third resistance connected in parallel being greater than or equal to the first predetermined value.

The controlling method may further include clamping a voltage applied on the first and second ends of the condenser at a second predetermined value by a varistor of the switching mode power supply, based on a voltage greater than or equal to the second predetermined value being applied to the first and second ends of the condenser.

In the controlling method, the second predetermined value may be lower than an inner voltage of the switching elements.

The controlling method may further include: detecting a magnitude of a voltage that is input to the switching mode power supply; and based on a voltage detected by a voltage detection unit of the switching mode power supply becoming lower than or equal to a third predetermined value after the switching elements are turned off, controlling the on/off operations of the switching elements.

In the controlling method, a capacity of the condenser may be lower than or equal to 47 uF.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

In describing embodiments of the disclosure, in case it is determined that detailed explanation of related known technologies may unnecessarily confuse the gist of the disclosure, the detailed explanation will be omitted. Also, overlapping explanation of the same components will be omitted as far as possible.

Also, the suffix "unit" for components used in the following description is provided or interchangeably used in consideration of only easiness of drafting the specification, and does not have meaning or a function of itself distinguishing it from other components.

In addition, the terminology used in the disclosure is used to describe embodiments, and is not intended to restrict and/or limit the disclosure. Further, singular expressions include plural expressions, unless defined differently in the context.

Also, in the disclosure, terms such as 'include' and 'have' should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, the expressions "first," "second," and the like used in the disclosure may be used to describe various elements regardless of any order and/or degree of importance. Also, such expressions are used only to distinguish one element from another element, and are not intended to limit the elements.

In the disclosure, the description that one element (e.g.: a first element) is "(operatively or communicatively) coupled with/to" or "connected to" another element (e.g.: a second element) should be interpreted to include both the case where the one element (e.g.: a first element) is directly coupled to the another element (e.g.: a second element), and the case where the one element (e.g.: a first element) is coupled to the another element (e.g.: a second element) through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element (e.g.: a first element) and the another element (e.g.: a second element).

Also, the terms used in the embodiments of the disclosure may be interpreted as meanings generally known to those of ordinary skill in the art described in the disclosure, unless defined differently in the disclosure.

Hereinafter, one or more embodiments of the disclosure will be described in detail with reference to the accompanying drawings.

Figure 1:
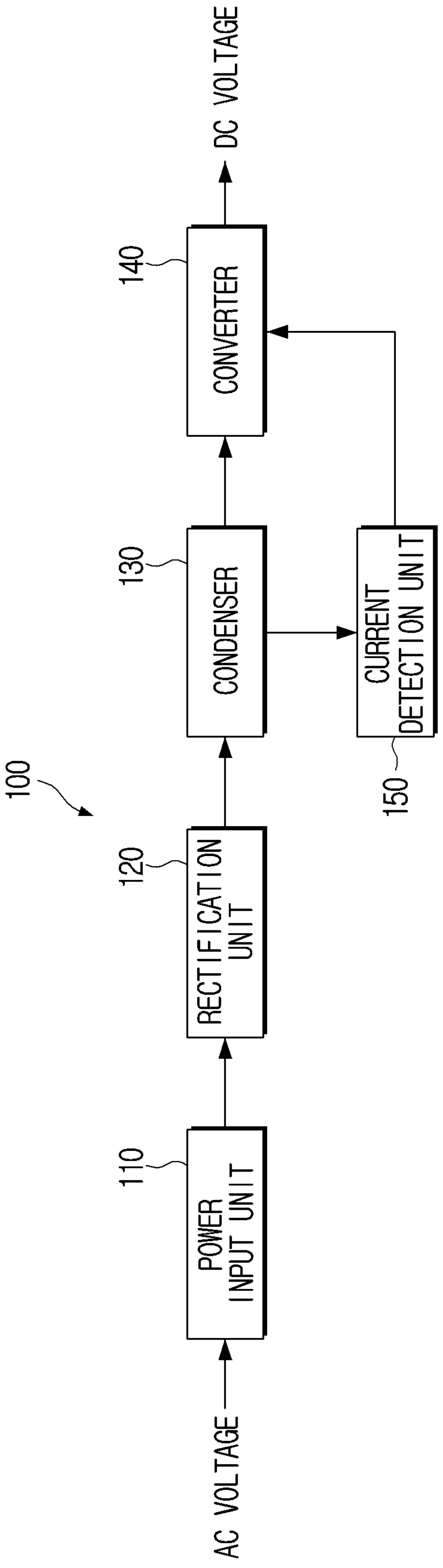
FIG. 1 is a block diagram of a switching mode power supply according to an embodiment of the disclosure.

FIG. 1 is a block diagram of a switching mode power supply according to an embodiment of the disclosure. According to FIG. 1, the switching mode power supply 100 includes a power input unit 110, a rectification unit 120, a condenser 130, a converter 140, and a current detection unit 150.

The switching mode power supply 100 is a device that converts an alternating power into a direct power by using on/off operations of switching elements, and provides the converted direct power.

According to an embodiment, the switching mode power supply 100 may be included inside an electronic device, and provide a direct power to various kinds of components of the electronic device. Also, according to an embodiment, the switching mode power supply 100 may be implemented as a device separate from an electronic device, and may be connected with the electronic device, and provide a direct power to various kinds of components of the electronic device. There is no limitation on the types of electronic devices that are provided with a direct power from the switching mode power supply 100. For example, the electronic devices may be various kinds of home appliances, display devices, audio devices, and servers, etc., but are not limited thereto.

The power input unit 110 may receive an input AC voltage. For example, the power input unit 110 may receive an input AC voltage through a power outlet to which an AC power is applied. Here, the AC voltage input into the power input unit 110 may have a size from 90 V to 264 V, but is not limited thereto.

The power input unit 110 may include an electromagnetic interference (EMI) filter for removing electronic noises from an input AC voltage signal. Also, the power input unit 110 may include a varistor for protecting an X-Cap of the EMI filter.

The rectification unit 120 may rectify an AC voltage input into the power input unit 110. For this, the rectification unit 120 may include various rectification circuits such as a half-wave rectification circuit, a full-wave rectification circuit, or a bridge rectification circuit.

The condenser 130 may smooth a voltage rectified through the rectification unit 120. Here, the capacity of the condenser 130 may be a small capacity of a degree that, in case a surge (e.g., ±8 kV) is input due to a thunderstroke, the input surge energy cannot be entirely absorbed. For example, the condenser may have a capacity of lower than or equal to 47 uF.

As examples of a case wherein a condenser having a small capacity is used for the switching mode power supply 100, there may be a case wherein a film condenser is used for preventing fire, or a case of a single stage converter wherein a condenser having a small capacity should be used, etc., but the cases are not limited thereto.

There is no limitation on the types of the condenser 130. For example, the condenser 130 may be an electrolytic condenser, a film condenser, or a ceramic condenser, but is not limited thereto.

The converter 140 may include switching elements, and may output a DC voltage based on a voltage applied on both ends of the condenser 130 and on/off duty ratios of the switching elements. The switching elements of the converter 140 may be one or more than one, and they may be connected with the condenser 130 in parallel.

The magnitude of a DC voltage output from the converter 140 may be determined based on the on/off duty ratios of the switching elements. The converter 140 may be an AC/DC converter or a DC/DC converter.

When the converter 140 outputs a DC voltage, the switching elements perform on/off operations with on/off duty ratios corresponding to the magnitude of the output DC voltage. Here, if a surge due to a thunderstroke is applied between a live point and a neutral point of the power input unit 110, the switching elements get to be influenced by the surge.

As described above, the condenser 130 has a small capacity of a degree that surge energy cannot be absorbed entirely. If the condenser 130 cannot absorb surge energy entirely, a high voltage is applied to both ends of the condenser 130.

Accordingly, if a high voltage is applied to both ends of the condenser 130 while the switching elements of the converter 140 are performing on/off operations for outputting a DC voltage, the switching elements of the converter 140 may break down easily.

However, if the switching elements of the converter 140 are in a turned-off state, the switching elements of the converter 140 may endure without a damage even if a voltage lower than or equal to an inner voltage is applied to both ends of the condenser 130. Here, the inner voltage means the maximum voltage that the switching elements of the converter 140 may endure without breaking down in a turned-off state.

Specifically, a voltage applied on both ends of the condenser 130 is determined by the capacity of the condenser 130 and the charge amount accumulated in the condenser 130, and the charge amount accumulated in the condenser 130 becomes the value of integrating the current flowing in the condenser 130. That is, a voltage applied to both ends of the condenser 130 due to a surge current is determined by the value of integrating the surge current.

The surge current includes a high frequency surge component and a low frequency surge component, and a high frequency surge current is generated first during a short time before a low frequency surge current is generated. A high frequency surge current flows on both ends of the condenser 130 earlier than a low frequency surge current, and the high frequency surge current may flow only during a short time. Accordingly, influence exerted by a high frequency surge current on a voltage applied to both ends of condenser 130 is slight, and a voltage applied to both ends of condenser 130 due to a surge current is mainly determined by a low frequency surge current.

Accordingly, if the switching elements of the converter 140 can be turned off by detecting a high frequency surge current flowing in the condenser 130, the switching elements of the converter 140 can endure without a damage even if a voltage lower than or equal to the inner voltage is applied to the voltage applied on both ends of the condenser 130.

According to an embodiment, the switching mode power supply 100 includes a current detection unit 150. The current detection unit 150 is configured to detect a surge current (in particular, a high frequency surge current) flowing in the condenser 130. If a surge occurs due to a thunderstroke, a surge current may flow in the condenser 130, and the current detection unit 150 may detect this. When a surge current is detected by the current detection unit 150, the switching elements of the convert 140 may be turned off.

For example, while the switching elements of the convert 140 are performing on/off operations for outputting a DC voltage, if a high frequency surge current is detected by the current detection unit 150, the switching elements of the converter 140 may be turned off. Accordingly, even if the voltage applied on both ends of the condenser 130 rises due to a low frequency surge current afterwards, the switching elements of the converter 140 may endure without a damage to the inner voltage.

In case a voltage applied to both ends of the condenser 130 exceeds the inner voltage of the switching elements of the converter 140, the switching elements of the converter 140 may break down even if they are in a turned-off state.

For preventing this, according to an embodiment, the switching mode power supply 100 may include a varistor connected with the condenser 130 in parallel. The varistor may clamp a voltage applied to both ends of the condenser 130 from a second predetermined value. Here, the second predetermined value may be lower than the inner voltage of the switching elements of the converter 140.

Accordingly, to both ends of the condenser 130, a voltage lower than the inner voltage of the switching elements of the converter 140 may be applied, and thus the switching elements of the converter 140 in a turned-off state can be sufficiently protected from a surge due to a thunderstroke.

Figure 2A:
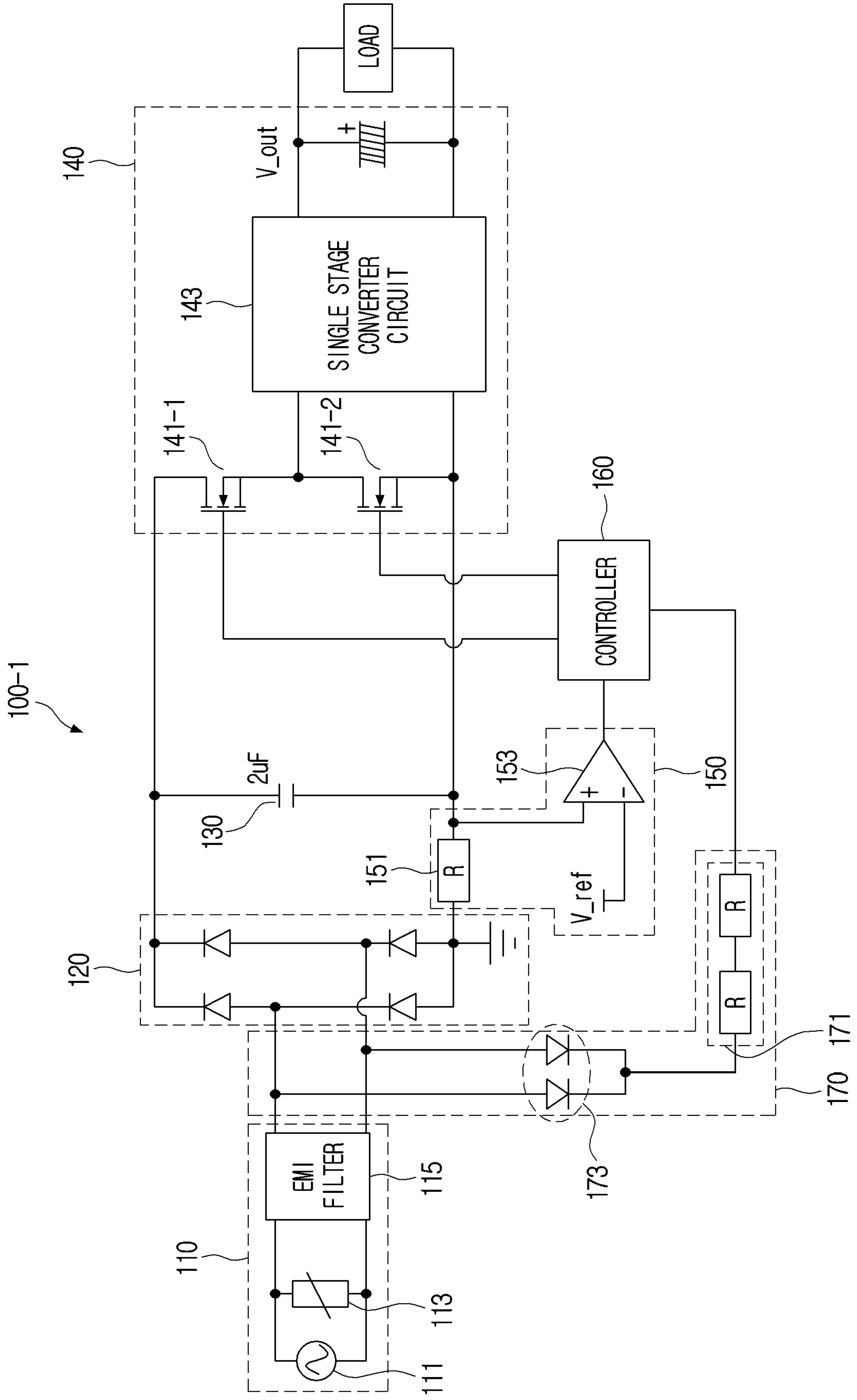
FIG. 2A is a diagram for illustrating a configuration and an operation of a switching mode power supply according to an embodiment of the disclosure.

FIG. 2A is a diagram for illustrating a configuration and an operation of a switching mode power supply according to an embodiment of the disclosure.

According to FIG. 2A, a switching mode power supply 100-1 may include the power input unit 110, the rectification unit 120, the condenser 130, the converter 140, the current detection unit 150, a controller 160, and a voltage detection unit 170.

The power input unit 110 may generally receive an input AC voltage 111 within a range of from 90 V to 264 V, and for protecting an X-Cap of an EMI filter 115 from a surge, a first varistor 113 may be located on the front end of the EMI filter 115. Here, as the first varistor 113, for reducing a leakage current that may be generated due to a damage according to continuous external noises, a 751 varistor having a clamping voltage of, for example, 1,250 V may be used.

The AC voltage 111 wherein an EMI component has been removed by the EMI filter 115 is rectified through the rectification unit 120, and is then smoothed through the condenser 130. The converter 140 includes switching elements 141-1, 141-2, and may output a DC voltage (V_out) to a load based on a voltage applied on both ends of the condenser 130 and on/off duty ratios of the switching elements 141-1, 141-2. Here, the switching elements 141-1, 141-2 may be implemented as semiconductor transistors for electronic power such as a metal-oxide-semiconductor field effect transistor (MOSFET), a bipolar junction transistor (BJT), or an insulated gate bipolar transistor (IGBT), etc.

In the embodiment of FIG. 2A, a single stage converter performing a power factor compensation function and an AC/DC conversion function together was used as the converter 140. The converter 140 includes the switching elements 141-1, 141-2, and the other circuit components 143 constituting the single stage converter. In the case of the single stage converter, the condenser 130 having a small capacity is used. For example, the condenser 130 may be a film condenser having a capacity of 2 uF as illustrated in FIG. 2A, but the capacity or the type of the condenser is not limited thereto.

The controller 160 is configured to control the operations of the converter 140. In particular, the controller 160 may control the magnitude of a DC voltage output by the converter 140 by controlling on/off operations of the switching elements 141-1, 141-2. For this, the controller 160 may provide a control signal for controlling the operations of the converter 140 (in particular, a control signal for controlling the on/off operations of the switching elements 141-1, 141-2) to the converter 140.

According to an embodiment, the controller 160 may be implemented as a control integrated chip (IC). In this case, the control IC may be included in the converter 140 as a component of the converter 140. Alternatively, the control IC may be arranged outside the converter 140 and connected with the converter 140.

Also, according to an embodiment, the controller 160 may be implemented as one function block of a processor for controlling the operations of the electronic device including the switching mode power supply 100-1. In this case, the processor may be implemented as at least one of a main control unit (MCU), a central processing unit (CPU), a micro-controller, an application processor (AP), or a communication processor (CP), or an ARM processor.

The voltage detection unit 170 is configured to detect a voltage input through the power input unit 110. The voltage detection unit 170 may provide a current flowing between the power input unit 110 and the rectification unit 120 to the controller 160 through a diode 173 and a resistance 171. The controller 160 may detect the magnitude of a voltage input into the power input unit 110 based on the current applied through the resistance 171. According to an embodiment, if a voltage detected by the voltage detection unit 170 is higher than or equal to a first predetermined value, the controller 160 may turn off the switching elements 141-1, 141-2.

The current detection unit 150 is configured to detect a surge current flowing in the condenser 130. For this, the current detection unit 150 may include a resistance 151 and a comparator 153. In the resistance 151, a current flowing in the condenser 130 may be applied to one end, and the other end may be connected to a ground terminal. The comparator 153 may compare a voltage applied to the one end of the resistance 151 due to a current flowing in the condenser 130 and a reference voltage (V_ref), and output an output voltage.

The output voltage of the comparator 153 is provided to the controller 160, and the controller 160 may detect a surge current flowing in the condenser 130 based on the output voltage of the comparator 153. According to an embodiment, when a surge current flowing in the condenser 130 is detected by the current detection unit 150, the controller 160 may turn off the switching elements 141-1, 141-2.

Hereinafter, an operation of the switching mode power supply 100-1 in case a surge due to a thunderstroke was input into the power input unit 110 will be described.

As described above, the condenser 130 has a small capacity of about 2 uF, and thus it may not absorb the entire surge energy which is strong (e.g., ±8 kV). If the condenser 130 cannot absorb the surge current entirely, a high voltage gets to be applied to both ends of the condenser 130, and the switching elements 141-1, 141-2 that are performing on/off operations for outputting a DC voltage may be damaged easily.

As described above, the magnitude of a voltage input into the power input unit 110 may be detected by the voltage detection unit 170, and accordingly, a method of turning off the switching elements 141-1, 141-2 in case an input voltage is detected to be high can be considered. However, in case a surge is input, the voltage applied on both ends of the condenser 130 rises quickly (e.g., about 8[uS]), and thus it is difficult to prevent the breakage of the switching elements 141-1, 141-2 by detecting a voltage input into the power input unit 110 and turning off the switching elements 141-1, 141-2.

Specifically, the size of the resistance 171 included in the voltage detection unit 170 is big, for detecting a high input voltage. Accordingly, a high frequency surge current cannot flow in the resistance 171, and a high frequency surge current cannot be detected by the voltage detection unit 170. The speed of rise of the voltage applied on both ends of the condenser 130 due to a low frequency surge current may be fast, as described above, and accordingly, even if a low frequency surge current is detected by the voltage detection unit 170, it may be difficult to turn off the switching elements 141-1, 141-2 before the switching elements 141-1, 141-2 break down.

Therefore, according to an embodiment of the disclosure, the switching mode power supply 100-1 may prevent breakage of the switching elements 141-1, 141-2 by detecting a high frequency surge current that is generated before the voltage applied on both ends of the condenser 130 rises and turning off the switching elements 141-1, 141-2.

Specifically, if a surge current flowing in the condenser 130 is detected by the current detection unit 150 while the converter 140 is outputting a DC voltage, the controller 160 may turn off the switching elements 141-1, 141-2.

Here, the comparator 153 of the current detection unit 150 is a simple comparator, and does not perform an amplifying function like an operational amplifier (OP amp). If the comparator 153 performs an amplifying function like an operational amplifier, there would be a problem that the speed is slow.

The resistance 151 may detect a surge current (in particular, a high frequency surge current) flowing in the condenser 130. For example, in case a resistance of 0.015(Ω) is used, if an impulse high frequency surge current of about 100[A] is generated, 1.5 V is applied to both ends of the resistance 151.

If the reference voltage (V_ref) of the comparator 153 is set as 1.5 V, in case a short impulse high frequency surge current of higher than or equal to 100[A] is generated, the output value of the comparator 153 is output as a "low (e.g., a first voltage)" or "high (e.g., a second voltage)" value according to the design, and the controller 160 may be triggered by this output value, and turn off (or block) the switching elements 141-1, 141-2. For example, in case a surge current does not flow in the condenser 130, the comparator 153 may output the first voltage. Here, if a voltage due to a surge current is applied to one end of the resistance 151, the comparator 153 may output the second voltage, and the controller 160 may turn off the switching elements 141-1, 141-2 based on the output voltage of the comparator 153 becoming the second voltage.

Except a strong surge current due to a thunderstroke, there is no case wherein an impulse current of 100[A] is generated in the switching mode power supply 100-1, and accordingly, even if a comparator 153 having a short delay time is used, a case wherein the switching mode power supply 100-1 malfunctions by a general noise does not occur.

As described above, if the switching elements 141-1, 141-2 are turned off, even if the voltage applied on both ends of the condenser 130 rises due to a low frequency surge current, the switching elements 141-1, 141-2 can endure to the inner voltage of the switching elements 141-1, 141-2 without a damage.

According to an embodiment, the switching mode power supply 100-1 may be re-operated by detecting a voltage input into the power input unit 110.

Specifically, after the switching elements 141-1, 141-2 are turned off, if a voltage detected by the voltage detection unit 170 becomes lower than or equal to a third predetermined value, the controller 160 may control on/off operations of the switching elements 141-1, 141-2 so that the converter 140 outputs a DC voltage.

Figure 2B:
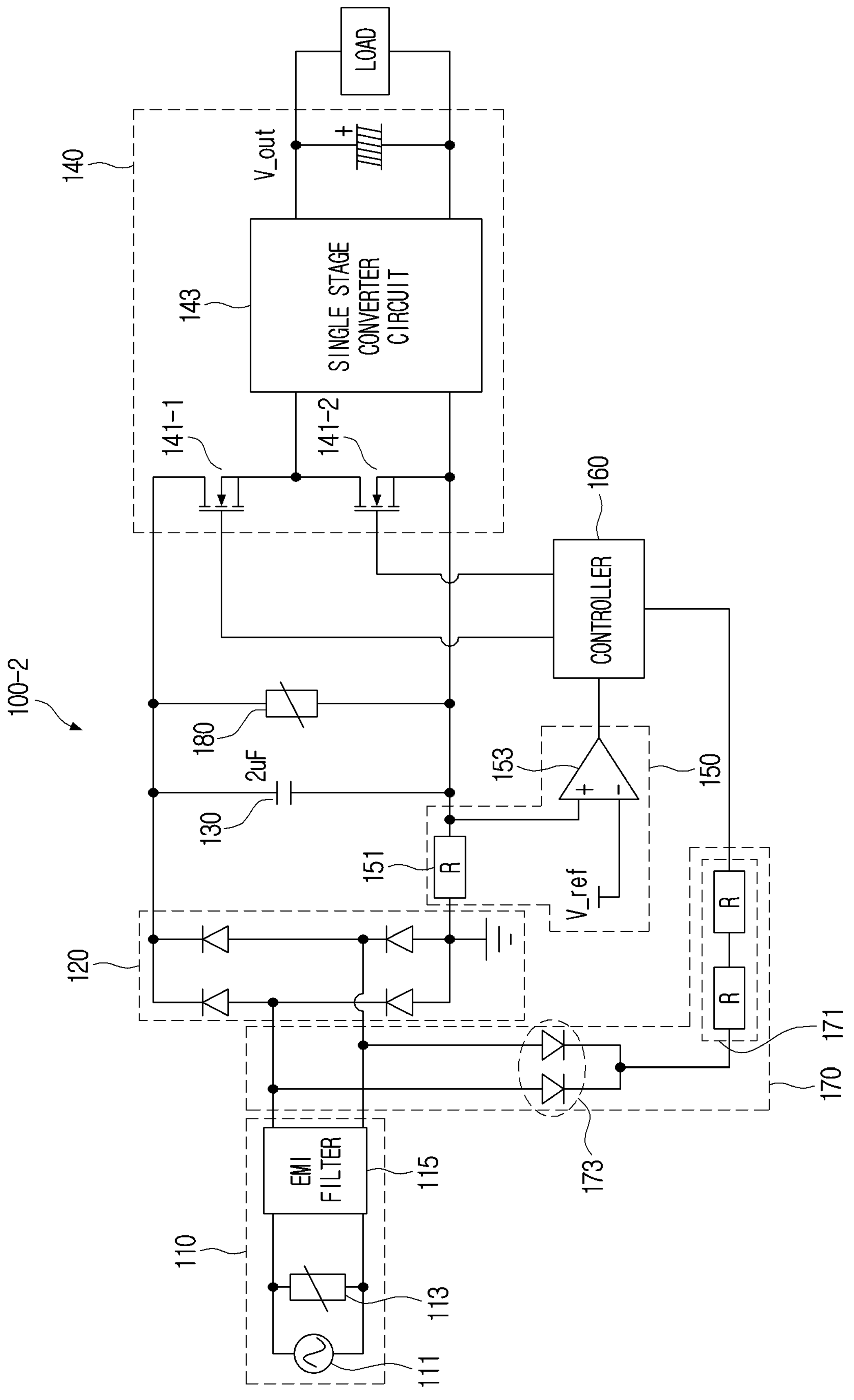
FIG. 2B is a diagram for illustrating a configuration and an operation of a switching mode power supply according to an embodiment of the disclosure.

FIG. 2B is a diagram for illustrating a configuration and an operation of a switching mode power supply according to an embodiment of the disclosure. The components and the operations in FIG. 2B are the same as those in FIG. 2A, except the feature of further including a second varistor 180 connected with the condenser 130 in parallel.

In case a strong surge voltage/surge current having energy of about ±8 kV are applied, the condenser 130 of 2 uF cannot absorb the entire energy. Therefore, according to an embodiment, the switching mode power supply 100-2 includes the second varistor 180, as illustrated in FIG. 2B.

For example, if a 751 varistor having a clamping voltage of 1,250 V is used as the second varistor 180, the voltage applied to both ends of the condenser 130 is clamped at 1,250 V. When the inner voltage of each of the switching elements 141-1, 141-2 is 650 V, in case both of the switching elements 141-1, 141-2 were turned off, the switching element 141-1 and the switching element 141-2 can endure up to 1,300 V.

Accordingly, as described above in FIG. 2A, if a high frequency surge current is detected before the voltage applied on both ends of the condenser 130 starts to substantially rise due to a low frequency surge current, and the switching elements 141-1, 141-2 are turned off in advance, and as illustrated in FIG. 2B, if the second varistor 180 is connected to the condenser 130 in parallel and the voltage applied on both ends of the condenser 130 is clamped to within 1,250 V, the switching elements 141-1, 141-2 can be protected from a strong surge.

In general, a response speed of a varistor is rather slow. However, as illustrated in FIG. 2B, in the switching mode power supply 100-2, in addition to the first varistor 113 of the power input unit 110, the second varistor 180 is added to the condenser 130 located on the rear end of the EMI filter 115 in parallel. The response speed of the varistor itself may be slow. In the case of a serial structure such as "the first varistor 113->the EMI filter 115->the second varistor 180," the rising speed of a surge voltage applied through the EMI filter 115 becomes rather slow. Accordingly, as illustrated in FIG. 2B, in the case of additionally applying the second varistor 180 to the condenser 130 on the rear end of the EMI filter 115, the second varistor 180 may clamp a surge current that became rather slow.

Figure 3:
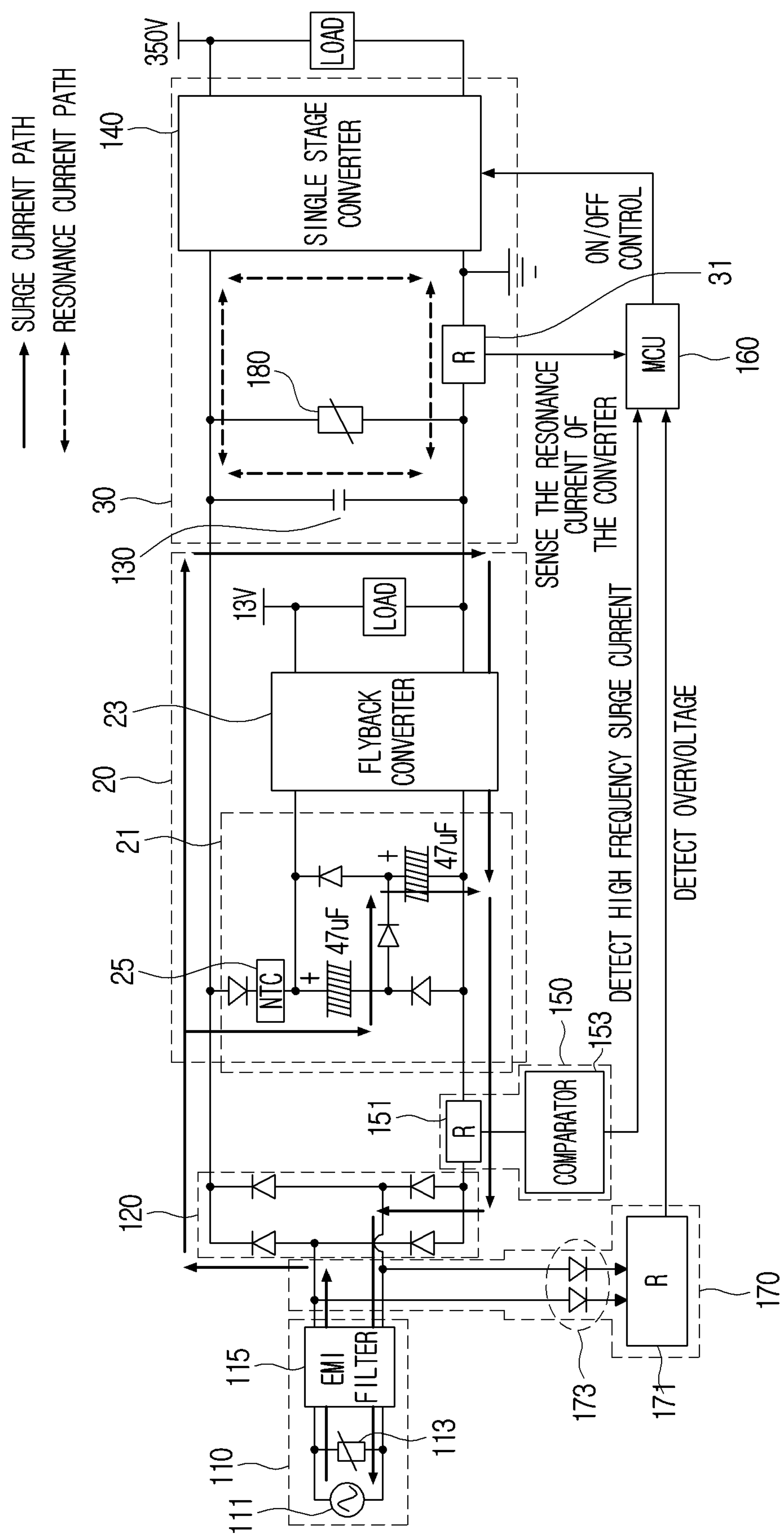
FIG. 3 is a diagram for illustrating a configuration and an operation of a switching mode power supply according to an embodiment of the disclosure.

FIG. 3 is a diagram for illustrating a configuration and an operation of a switching mode power supply according to an embodiment of the disclosure. In describing FIG. 3, regarding the same components and operations as those described above through FIG. 2A and FIG. 2B, overlapping explanation will be omitted.

According to FIG. 3, the switching mode power supply 100-3 includes a power input unit 110, a rectification unit 120, a low capacity block 20, a high capacity block 30, a current detection unit 150, a controller 160, and a voltage detection unit 170.

In the switching mode power supply 100-3 in FIG. 3, a main control unit (MCU) was used as the controller 160.

The high capacity block 30 that is in charge of output of 350 V was implemented by using a converter 140 (e.g. a single stage converter) including a power factor correction function. Accordingly, on the front end of the converter 140, a condenser 130 (e.g. a film condenser) having a small capacity (e.g., 2 uF) is arranged, and the second varistor 180 is arranged in parallel with the condenser 130.

The resistance 31 of the high capacity block 30 may detect a resonance current, and a detected resonance current may be used for on/off control of the switching elements included in the converter 140.

The low capacity block 20 that is in charge of output of 13 V was implemented by using a flyback converter 23. In the case of the flyback converter 23, it can be seen that a valley fill circuit 21 which is a manual power factor correction (PFC) circuit is applied on the front end for a power factor correction function.

In the valley fill circuit 21, two electrolytic condensers having a capacity/an inner voltage of 47 uF/450 V are connected serially. Accordingly, the synthesized capacity of the two condensers becomes 23.5 uF, and this does not reach 68 uF which is a capacity that can absorb strong surge energy (e.g., ±8 kV) entirely.

However, in the path of the low capacity block 20, a negative temperature coefficient (NTC) 25 is included. The NTC 25 is an element of which resistance component is big at the room temperature, but of which temperature rises and the resistance falls when a current higher than or equal to a specific current flows. In the case of a circuit in charge of a small load such as the flyback converter 23, efficiency does not become a big problem, and thus a strong surge current introduced can be reduced by using the NTC 25 operating as a resistance.

However, as the high capacity block 30 is in charge of a high capacity of at least 300[W] or higher, if the NTC 25 is applied, there is a problem that a damage occurs, and the efficiency deteriorates greatly. For resolving the problems of a damage and heat generation, there are cases of using a relay circuit together with the NTC 25, but in case the NTC is bypassed with the relay circuit, there would be no use in absorbing surge energy.

Figure 4:
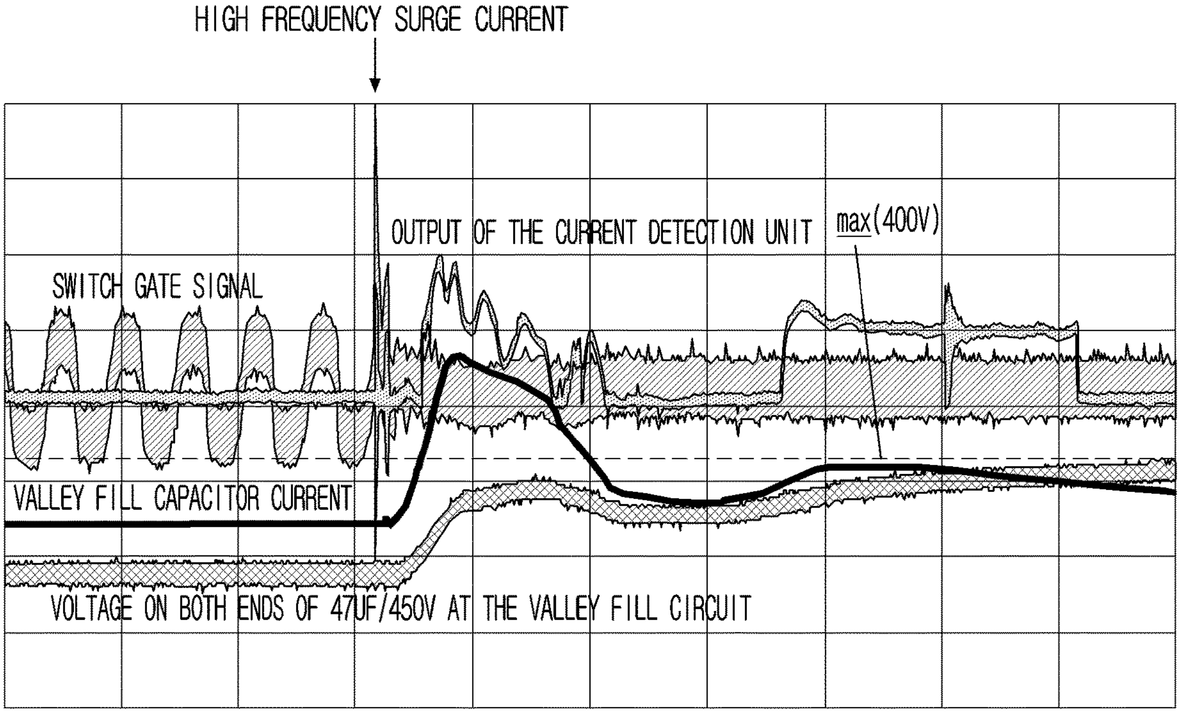
FIG. 4 is test waveforms for various kinds of signals of the switching mode power supply in FIG. 3.

FIG. 4 is test waveforms for various kinds of signals of the switching mode power supply in FIG. 3. In case a strong surge of ±8 kV is applied between a live point and a neutral point, the current detection unit 150 of the switching mode power supply 100-3 cannot detect a high frequency surge current. Accordingly, the controller 160 may turn off the switching elements 141-1, 141-2 included in the converter 140 first before a low frequency surge current flows.

Referring to FIG. 4, it can be seen that, after a high frequency surge current is detected and the switching elements 141-1, 141-2 are turned off, the voltage applied on both ends of the condenser of 47 uF/450 V at the valley fill circuit 21 rises by a low frequency surge current. This may be the same for the voltage applied on both ends of the condenser 130 on the front end of the converter 140. The voltage applied to both ends of the condenser of 47 uF/450 V at the valley fill circuit 21 becomes about lower than or equal to 400 V due to the influence of the NTC 25, and thus there would be no problem in the element stress.

Figure 5A:
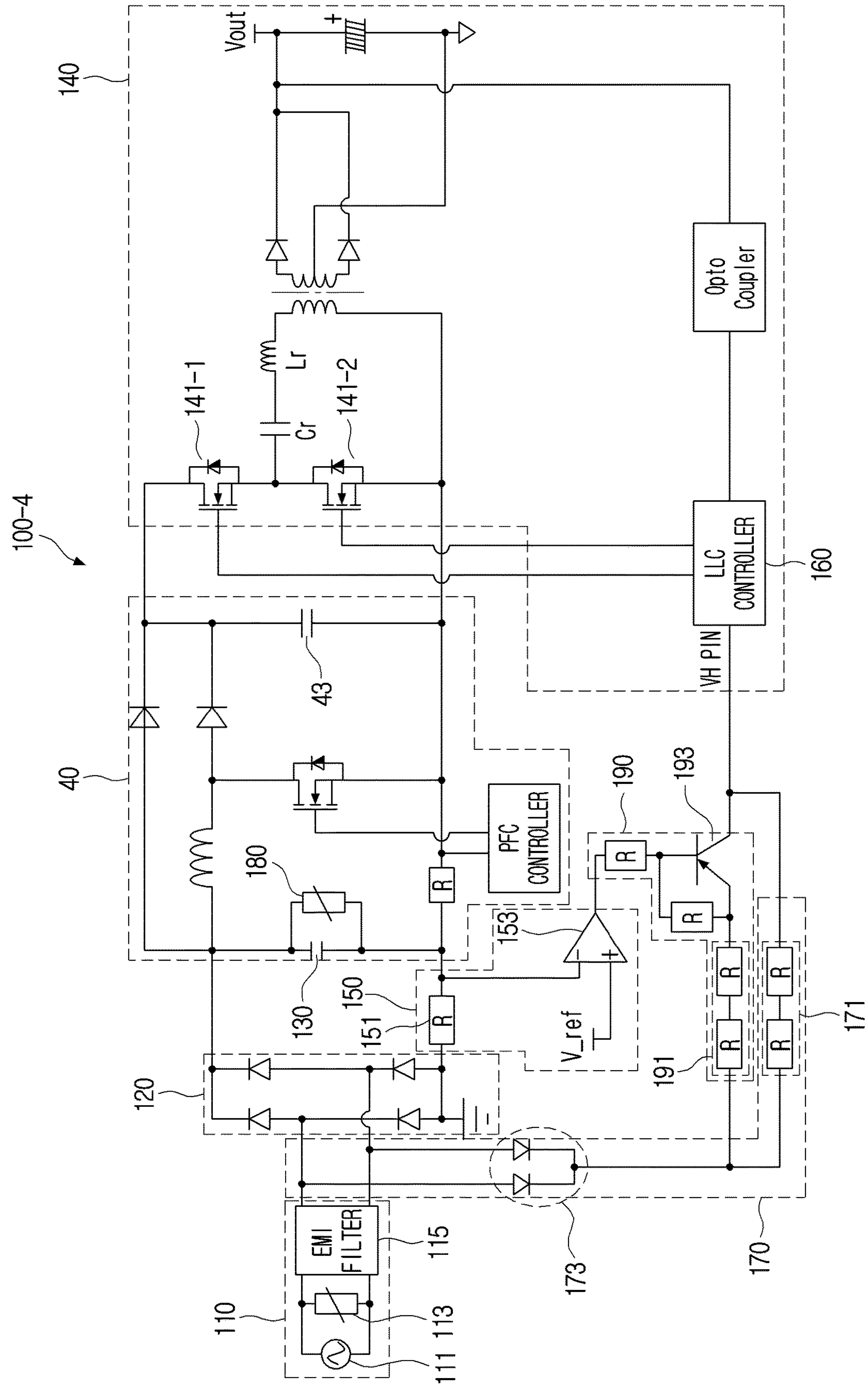
FIG. 5A is a diagram for illustrating a configuration and an operation of a switching mode power supply according to an embodiment of the disclosure.

FIG. 5A is a diagram for illustrating a configuration and an operation of a switching mode power supply according to an embodiment of the disclosure. In describing FIG. 5, regarding the same components and operations as those described above through FIG. 2A and FIG. 2B, overlapping explanation will be omitted.

FIG. 5A illustrates a switching mode power supply 100-4 of a two stage structure including a power factor correction circuit and an LLC converter.

According to FIG. 5A, the switching mode power supply 100-4 includes a power input unit 110, a rectification unit 120, a power factor correction unit 40, an LLC converter 140, a current detection unit 150, a voltage detection unit 170, and a resistance unit 190.

In the example of FIG. 5A, the aforementioned condenser 130 and second varistor 180 are included in the power factor correction unit 40, and the LLC controller 160 is included in the LLC converter 140. Here, as the condenser 130, a film condenser having a capacity of about 2 uF may be used, for example.

In general, in a switching mode power supply of a two stage structure, an electrolytic condenser having a big capacity is used as the output condenser of the power factor correction unit, for removing ripples, and absorbing a surge current due to a thunderstroke. However, an electrolytic condenser has a limited lifespan, and fire make break out.

Regarding removal of ripples, ripples can be reduced to within a specific range by using an algorithm limiting the current of the power factor correction unit, or performing precise control. Therefore, according to an embodiment, by using a film condenser having a capacity of about 10 uF as the output condenser 43 of the power factor correction unit 40, as illustrated in FIG. 5A, the problems of risk of breakout of fire or limitation of the lifespan due to use of an electrolytic condenser can be resolved.

The problem of a surge due to a thunderstroke may be resolved by utilizing the current detection unit 150 and the second varistor 180 as described above.

Referring to FIG. 5A, the LLC controller 160 may detect an input voltage input into the power input unit 110 through a VH pin. Specifically, referring to FIG. 5B, the LLC controller 160 may detect an input voltage through voltage distribution of the resistance 171 and the resistance 161 serially connected through the VH pin. That is, the LLC controller 160 may detect an input voltage based on a current applied to the VH pin through the resistance 171, and in case the detected voltage is higher than or equal to the first predetermined value, the LLC controller 160 may turn off the switching elements 141-1, 141-2. Accordingly, in case an input voltage input into the power input unit 110 is abnormally high, the LLC controller 160 can protect the switching elements 141-1, 141-2.

However, for detecting a high input voltage, the size of the resistance 171 of the voltage detection unit 170 is big. Accordingly, a high frequency surge current cannot flow in the resistance 171, and a high frequency surge current cannot be detected by using only the voltage detection unit 170.

Figure 5B:
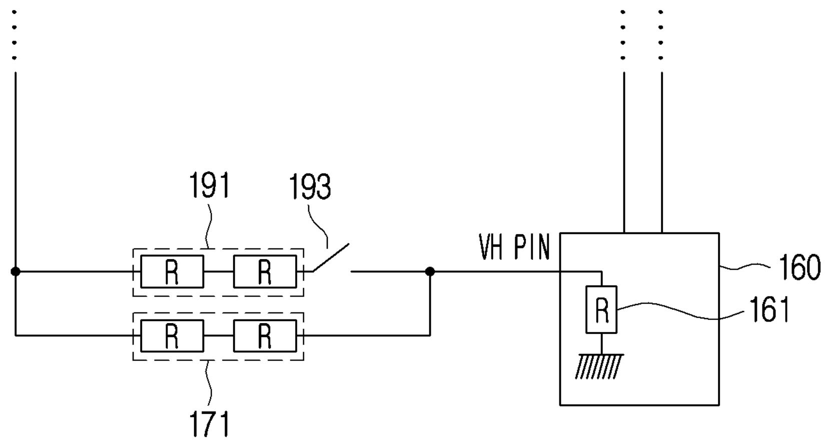
FIG. 5B is a diagram for illustrating the operations of the resistance unit and an LLC controller in FIG. 5A.

For detecting a high frequency surge current by using the VH pin, according to an embodiment, the switching mode power supply 100-4 includes the resistance unit 190, as illustrated in FIG. 5A and FIG. 5B.

The resistance unit 190 includes a resistance 191 and a switch 193 that is turned on or off based on the output voltage of the comparator 153. The switch 193 may be implemented by using a semiconductor transistor such as a BJT, a MOSFET, an IGBT, etc., but is not limited thereto.

When the comparator 153 outputs a low (e.g., the first voltage) value in case a high frequency surge current flowing in the condenser 130 is not detected, and outputs a high (e.g., the second voltage) value in case a high frequency surge current flowing in the condenser 130 is detected, the switch 193 is turned on when the output voltage of the comparator 153 becomes the second voltage, and the resistance 191 is connected with the resistance 171 in parallel.

In this case, the sum of resistance values of the resistance 191 and the resistance 171 is lower than the resistance value of the resistance 171, and thus, a high frequency surge current may be input into the VH pin. Accordingly, the LLC controller 160 may detect an input voltage based on a current applied through the resistance 191 and the resistance 171 that are connected in parallel, and if the input voltage is higher than or equal to the first predetermined value, the LLC controller 160 may turn off the switching elements 141-1, 141-2.

That is, according to an embodiment, by adding the current detection unit 150 and the resistance unit 190 to the components of the conventional switching mode power supply that detects a high voltage through the VH pin and turns off the switching elements 141-1, 141-2, a high frequency surge current may be detected by the current detection unit 150 before a low frequency surge current flows in the condenser 130 (i.e., before the voltage applied on both ends of the condenser 130 rises to a high value due to a low frequency surge current), and the switching elements 141-1, 141-2 may be turned off in advance by using the VH pin.

However, embodiments are not limited thereto, and the VH pin of the controller 160 does not necessarily have to be used for detecting a high frequency surge current and turning off the switching elements 141-1, 141-2. That is, depending on embodiments, the output of the comparator 153 may be input into another pin of the controller 160 (or the LLC controller 160), and in this case, the controller 160 (or the LLC controller 160) may directly turn off the switching elements 141-1, 141-2 based on the output of the comparator 153.

If the switching element 141-1 and the switching element 141-2 respectively having the inner voltage of 650 V are used, and the switching elements 141-1, 141-2 are turned off in advance as described above, the switching element 141-1 and the switching element 141-2 are serially connected, and thus they can endure a surge voltage of 1,300 V. Accordingly, if a 751 varistor having a clamping voltage of 1,250 V is used as the second varistor 180 connected with the condenser 130 in parallel, the switching elements 141-1, 141-2 can be protected safely from a surge due to a thunderstroke.

Figure 6:
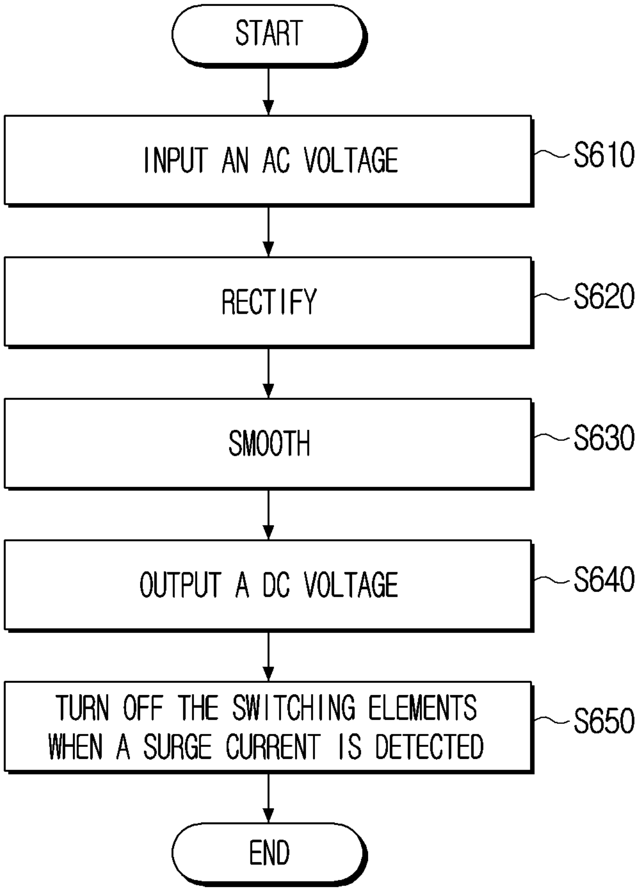
FIG. 6 is a flow chart illustrating a controlling method of a switching mode power supply according to an embodiment of the disclosure.

FIG. 6 is a flow chart illustrating a controlling method of a switching mode power supply according to an embodiment of the disclosure. According to FIG. 6, the switching mode power supply 100, 100-1, 100-2, 100-3, 100-4 receives an input AC voltage in operation S610, and rectifies the input AC voltage in operation S620, and smooths the rectified voltage through the condenser 130 in operation S630. Here, the capacity of the condenser 130 may be lower than or equal to 47 uF.

Accordingly, the switching mode power supply 100, 100-1, 100-2, 100-3, 100-4 outputs a DC voltage based on the voltage applied on both ends of the condenser 130 and the on/off duty ratios of the switching elements 141-1, 141-2 in operation S640.

Here, if a surge current flowing in the condenser 130 is detected, the switching mode power supply 100, 100-1, 100-2, 100-3, 100-4 turns off the switching elements 141-1, 141-2 in operation S650.

Here, the switching mode power supply 100, 100-1, 100-2, 100-3, 100-4 may control the magnitude of the DC voltage by controlling on/off operations of the switching elements 141-1, 141-2. Also, if a surge current is detected while the DC voltage is being output, the switching mode power supply 100, 100-1, 100-2, 100-3, 100-4 may turn off the switching elements 141-1, 141-2.

Also, the switching mode power supply 100, 100-1, 100-2, 100-3, 100-4 may include a current detection unit 150 for detecting a surge current. The current detection unit 150 may include a first resistance 151 wherein a current flowing in the condenser 130 is applied to one end, and the other end is connected to a ground terminal, and a comparator 153 that compares a voltage applied to the one end of the first resistance 151 due to the current flowing in the condenser 130 and a reference voltage (V_ref), and outputs an output voltage.

Here, the comparator 153 may output a second voltage if a voltage due to a surge current is applied to the one end of the first resistance 151 while outputting the first voltage. Accordingly, the switching mode power supply 100, 100-1, 100-2, 100-3, 100-4 may turn off the switching elements 141-1, 141-2 based on the output voltage of the comparator 153 becoming the second voltage.

The switching mode power supply 100, 100-1, 100-2, 100-3, 100-4 may include a second resistance 171, and include a voltage detection unit 170 for detecting the magnitude of an input AC voltage through the second resistance 171, and if a voltage detected by the voltage detection unit 170 is higher than or equal to a first predetermined value, the switching mode power supply 100, 100-1, 100-2, 100-3, 100-4 may turn off the switching elements 141-1, 141-2.

Also, the switching mode power supply 100-4 may include a third resistance 191 that is connected with the second resistance 171 in parallel when the output voltage of the comparator 153 becomes the second voltage, and if a voltage detected by the second resistance 171 and the third resistance 191 connected in parallel is higher than or equal to the first predetermined value, the switching mode power supply 100-4 may turn off the switching elements 141-1, 141-2.

In addition, in case a voltage higher than or equal to a second predetermined value is applied to both ends of the condenser 130, the voltage may be clamped at the second predetermined value by the varistor 180 connected with the condenser 130 in parallel. Here, the second predetermined value may be a value that is lower than an inner voltage of the switching elements 141-1, 141-2.

After the switching element 141-1 is turned off, if the magnitude of the input AC voltage becomes lower than or equal to a third predetermined value, the switching mode power supply 100, 100-1, 100-2, 100-3, 100-4 may control on/off operations of the switching elements 141-1, 141-2 to output the DC voltage.

According to the one or more embodiments as described above, a switching mode power supply can be constituted by using a condenser having a small capacity. In particular, a switching mode power supply can also be constituted by using only a condenser having a small capacity. In this case, the lifespan of the switching mode power supply can be lengthened, and fire can be prevented.

The problem of a damage to the semiconductor elements (in particular, the switching elements of the converter) due to a thunderstroke that may become a problem in the case of using a condenser having a small capacity, as above, can be resolved just with addition of the current detection unit 150 and a simple circuit such as the second varistor 180.

Accordingly, various issues such as lengthening of the lifespan of the switching mode power supply, securing of safety from fire, and reduction of the production cost can be resolved simultaneously.

In addition, as a film condenser can be used without using an electrolytic condenser having a big volume, the volume of the switching mode power supply, in particular, the volume of the power factor correction block can be reduced overall. Accordingly, when designing various electronic devices including a switching mode power supply, a lot of degree of freedom can be given in the aspect of the design.

The one or more embodiments of the disclosure may be implemented as software including instructions stored in machine-readable storage media, which can be read by machines (e.g.: computers). Here, the machines refer to devices that call instructions stored in a storage medium, and can operate according to the called instructions, and the devices may include the switching mode power supply 100-, 100-1, 100-2, 100-3, 100-4 according to the embodiments disclosed herein or electronic devices that are supplied with power from the switching mode power supply 100-, 100-1, 100-2, 100-3, 100-4.

In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment, methods according to the one or more embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the one or more embodiments (e.g.: a module or a program) may include a singular object or a plurality of objects. Also, among the aforementioned corresponding sub components, some sub components may be omitted, or other sub components may be further included in the one or more embodiments. Alternatively or additionally, some components (e.g.: a module or a program) may be integrated as an object, and perform the functions that were performed by each of the components before integration identically or in a similar manner. Operations performed by a module, a program, or other components according to the one or more embodiments may be executed sequentially, in parallel, repetitively, or heuristically. Or, at least some of the operations may be executed in a different order or omitted, or other operations may be added.

Further, the descriptions above are merely example explanations of the technical idea of the disclosure, and various substitutions and modifications may be made by those having ordinary skill in the technical field to which the disclosure belongs, within the scope of the intrinsic characteristics of the disclosure. Also, the embodiments according to the disclosure are not for limiting the technical idea of the disclosure, but for explaining the technical idea, and the scope of the technical idea of the disclosure is not limited by the embodiments. Accordingly, the scope of protection of the disclosure should be interpreted based on the appended claims, and all technical ideas within an equivalent scope thereto should be interpreted to belong to the scope of protection of the disclosure.

What is claimed is:

1. A switching mode power supply comprising:

a power input unit configured to receive an input alternating current (AC) voltage;

a rectification unit configured to rectify the input AC voltage;

a condenser configured to smooth the rectified input AC voltage;

a current detection unit configured to detect a surge current flowing in the condenser; and a converter comprising switching elements, the converter outputting a direct current (DC) voltage based on a voltage applied to a first end of the condenser and a second end of the condenser and on/off duty ratios of the switching elements;

wherein the switching elements are configured to be turned off based on the surge current being detected by the current detection unit, wherein the switching mode power supply further comprises a controller configured to:

control a magnitude of the DC voltage output by the converter by controlling on/off operations of the switching elements, and based on the current detection unit detecting the surge current while the converter outputs the DC voltage, turn off the switching elements, wherein the switching elements comprise a first switching element and a second switching element that is structurally identical to the first switching element, wherein the current detection unit comprises:

a first resistance having a first end to which a current flowing in the condenser is applied, and a second end connected to a ground terminal; and a comparator configured to:

compare a voltage applied to the first end of the first resistance and a reference voltage, and output a first output voltage in a case that the current detection unit detects that the surge current does not flow in the condenser, and wherein the second end of the first resistance is connected to an end of the rectification unit.

2. The switching mode power supply of claim 1, wherein the comparator is further configured to, based on a voltage due to the surge current being applied to the first end of the first resistance, output a second output voltage, and wherein the controller is further configured to, based on the second output voltage being output by the comparator, turn off the switching elements.

3. The switching mode power supply of claim 2, further comprising a voltage detection unit comprising a second resistance, wherein the voltage detection unit is configured to provide a current flowing between the power input unit and the rectification unit through the second resistance, and wherein the controller is further configured to, based on a first voltage detected due to a current applied to the controller through the second resistance being greater than or equal to a first predetermined value, turn off the switching elements.

4. The switching mode power supply of claim 3, further comprising a third resistance that is connected in parallel with the second resistance when the comparator outputs the second output voltage, and wherein the controller is configured to, based on a second voltage, detected based on a current applied through the second resistance and the third resistance connected in parallel, being greater than or equal to the first predetermined value, turn off the switching elements.

5. The switching mode power supply of claim 1, further comprising a varistor connected in parallel with the condenser, wherein a voltage applied to the first end of the condenser and the second end of the condenser is clamped at a second predetermined value by the varistor, based on a voltage greater than or equal to the second predetermined value being applied to the first end of the condenser and the second end of the condenser.

6. The switching mode power supply of claim 5, wherein the second predetermined value is lower than an inner voltage of the switching elements.

7. The switching mode power supply of claim 1, further comprising a voltage detection unit configured to detect a magnitude of a voltage input through the power input unit, wherein the controller is further configured to, based on a voltage detected by the voltage detection unit becoming lower than or equal to a third predetermined value after the switching elements are turned off, control the on/off operations of the switching elements.

8. The switching mode power supply of claim 1, wherein a capacity of the condenser is lower than or equal to 47 uF.

9. A controlling method of a switching mode power supply, the controlling method comprising:

receiving an input alternating current (AC) voltage;

rectifying, by a rectification unit, the input AC voltage;

smoothing the rectified input AC voltage through a condenser of the switching mode power supply;

outputting a direct current (DC) voltage based on a voltage applied to a first end of the condenser and a second end of the condenser and on/off duty ratios of switching elements of a converter of the switching mode power supply;

detecting a surge current flowing in the condenser; and based on the surge current being detected, turning off the switching elements, wherein the outputting the DC voltage comprises controlling a magnitude of the DC voltage by controlling on/off operations of the switching elements, wherein the turning off the switching elements comprises, based on detecting the surge current while the DC voltage is being output, turning off the switching elements, wherein the switching elements comprise a first switching element and a second switching element that is structurally identical to the first switching element, wherein the controlling method further comprises:

applying a current flowing in the condenser to a first end of a first resistance of a current detection unit of the switching mode power supply;

comparing, by a comparator of the switching mode power supply, a voltage applied to the first end of the first resistance due to the current flowing in the condenser with a reference voltage; and outputting, by the comparator, a first output voltage in a case that the surge current is not detected to be flown in the condenser, and wherein a second end of the first resistance is connected to a ground and an end of the rectification unit.

10. The controlling method of claim 9, further comprising:

based on a voltage due to the surge current being applied to the first end of the first resistance, outputting a second output voltage by the comparator; and based on the comparator outputting the second output voltage, turning off the switching elements.

11. The controlling method of claim 10, further comprising:

detecting, by a voltage detection unit of the switching mode power supply, a magnitude of the input AC voltage through a second resistance, and based on a first voltage detected by the voltage detection unit, the first voltage being greater than or equal to a first predetermined value, turning off the switching elements.

12. The controlling method of claim 11, further comprising turning off the switching elements, based on a second voltage due to a current applied through the second resistance and a third resistance connected in parallel being greater than or equal to the first predetermined value.

13. The controlling method of claim 9, further comprising clamping a voltage applied on the first end of the condenser and the second end of the condenser at a second predetermined value by a varistor of the switching mode power supply, based on a voltage greater than or equal to the second predetermined value being applied to the first end of the condenser and the second end of the condenser.

14. The controlling method of claim 13, wherein the second predetermined value is lower than an inner voltage of the switching elements.

15. The controlling method of claim 9, further comprising:

detecting a magnitude of a voltage that is input to the switching mode power supply; and based on a voltage detected by a voltage detection unit of the switching mode power supply becoming lower than or equal to a third predetermined value after the switching elements are turned off, controlling the on/off operations of the switching elements.

16. The controlling method of claim 9, wherein a capacity of the condenser is lower than or equal to 47 uF.

* * * * *